Sept. 25, 1934. H. M. McCLURE 1,974,966
LOCK EQUIPPED COUPLING PIN
Filed Nov. 16, 1933

Inventor
Hugh M. McClure
By his Attorneys
Merchant Kilgore

Patented Sept. 25, 1934

1,974,966

UNITED STATES PATENT OFFICE 1,974,966

LOCK-EQUIPPED COUPLING PIN

Hugh M. McClure, Kearney, Nebr.

Application November 16, 1933, Serial No. 698,356

4 Claims. (Cl. 85—3)

My present invention provides an extremely simple and highly efficient lock-equipped coupling pin adapted for various different uses to couple together separable devices. This improved coupling pin will be found especially serviceable for use in connecting trailers to automobiles or motor-propelled vehicles, and because of its safety features, is especially recommended for that purpose. Coupling pins used for the particular purpose just noted are subject to hard usage and to a great deal of jarring actions which tend to throw or work the pins out of their coupling positions. My improved lock-equipped coupling pin, whether used in vertical or horizontal position, eliminates all possibility of accidental working of the pin out of position and hence is desirable for use in all places where the coupled elements are subject to jars, vibrations, throwing actions or the like that tend to unseat the pins. The serious accidents that might and usually would follow accidental uncoupling of a trailer from an automobile are too obvious to require any further discussion.

A commercial form of the lock-equipped coupling pin is illustrated in the accompanying drawing, wherein like characters indicate like parts throughout the several views.

Referring to the drawing.

Figure 1:
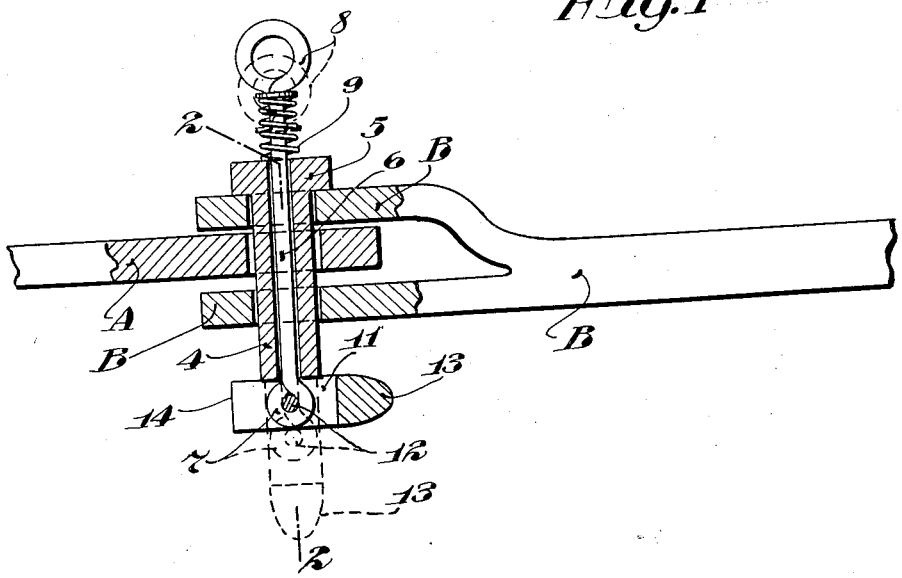
Fig. 1 is a view partly in side elevation, but chiefly in vertical axial section, showing the improved lock-equipped coupling pin applied to connect the drawbar or tongue of a trailer truck to the drawbar of an automobile or motor-propelled vehicle.
Figure 2:
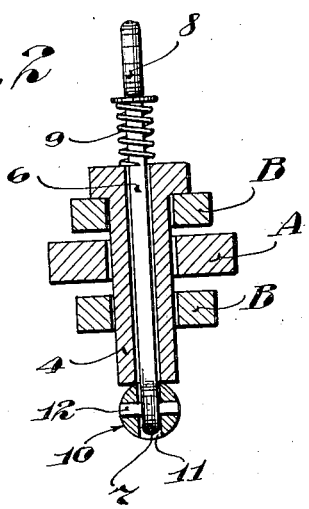
Fig. 2 is a vertical section taken on the line 2—2 of Fig. 1.
Figure 3:
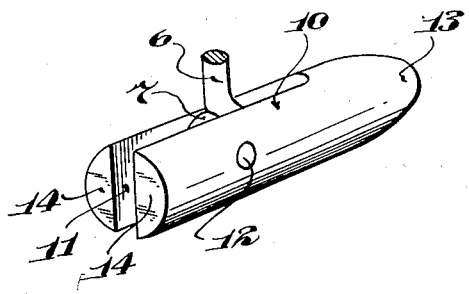
Fig. 3 is a perspective showing the lock piece removed from the coupling pin.

In the drawing, Figs. 1 and 2, the coupling bar of the automobile or motor-propelled vehicle is indicated by the character *a* and the trailer tongue or drawbar by the character *b*. As shown, the drawbar *b* has a vertical forked front end that straddles or embraces the drawbar *a* and has pin seats in its upper and lower prongs that are adapted to register with a pin seat in the drawbar.

The coupling pin 4 is tubular and at its upper end is formed with a head or enlargement 5. This tubular pin, as is obvious, is adapted to be freely inserted through the aligned perforations of the drawbar and coupling bar. Working axially and freely through the tubular pin 4 is a lock bolt 6, which, at its lower end, is shown as provided with an eye 7 and at its upper end is provided with an eye or head 8. A coiled compression spring surrounds the upper portion of the bolt 5 and is compressed between the pin head 5 and bolt head 8.

A lock piece is pivoted to the lower end of the lock bolt 6. As shown, this lock piece 10 is bifurcated or split by a slot 11 that extends from one end of said lock piece but terminates very much short of the other end thereof. The eye 7, at the lower end of the lock bolt 6, is inserted in the slot 11 and is pivotally connected to the prongs or side members of the lock piece 10 by means of a rivet 12, that is located farther from the end 13 than it is from the end 14 of said lock piece, so that the long end of said lock piece is considerably heavier than the short end thereof. This lock piece is preferably in the same diameter as the lock pin 4 and can be made in different ways. For example, it can be made from a piece of round steel by cutting a slot 11 therein; it can be forged from a half round iron or steel, and might, in some instances even be cast metal.

The end 14 is cut flat and approximately in a plane perpendicular to the axis of the lock piece, so that when the said end 14 is turned against the flat lower end of the lock pin 4, said lock piece will, under the tension of the spring 9, acting through the lock bolt 6, hold said lock piece in alignment with the lock pin, as shown by dotted lines in Fig. 1, so that then the pin and lock piece act as a continuous or straight member capable of being readily inserted through or removed from the coupled elements. The end 13 is preferably tapered to facilitate its insertion through the holes in the members to be coupled together.

In the use of the device, when the pin is to be inserted to couple elements together, the spring 9 will be compressed by taking hold of the upper eye 8 of the lock bolt 6 and pressing the same downward so that the lock piece 13 will drop in straight alignment with the pin and then when the bolt is released, the spring 9 will hold the flat end 14 of said lock piece firmly against the flat lower end of the lock pin. After the pin has been inserted, the lock piece should be turned into its horizontal position shown by full lines in Fig. 1, and in which position, as is obvious, it will be very firmly held by the tension of the spring. When the bolt is to be removed, the rod is pressed down against the tension of the spring and, thereupon the lock piece will drop back to its depending position aligned with the pin and upon release of the spring, it will be held in alignment with the pin for ready removal.

What I claim is:

1. The combination with a tubular lock pin having a head at one end, of a lock bolt extended axially through and projecting from both ends of said pin, a spring compressed between the head of said pin and the upper end of said lock bolt, and a bifurcated lock piece, said lock bolt at its lower end having an eye inserted between the prongs of said lock piece and pivotally connected thereto, one end of said lock piece and the lower end of said coupling pin having flat surfaces which, when engaged, hold said lock piece in alignment with said pin.

2. The combination with a tubular lock pin having a head at one end, of a lock bolt extended axially through and projecting from both ends of said pin, a spring compressed between the head of said pin and the upper end of said lock bolt, and a bifurcated lock piece, said lock bolt at its lower end having an eye inserted between the prongs of said lock piece and pivotally connected thereto, one end of said lock piece and the lower end of said coupling pin having flat surfaces which, when engaged, hold said lock piece in alignment with said pin, one end of said lock piece being heavier than the other so that when released, it will drop into alignment with said pin.

3. The structure defined in claim 1 in which said lock piece is round in cross-section and has approximately the same diameter as said coupling pin, the prongs thereof being flattened at the open end of said lock piece for engagement with the lower end of said coupling pin.

4. The structure defined in claim 1 in which said lock piece is round in cross-section and has approximately the same diameter as said coupling pin, the prongs thereof being flattened at the open end of said lock piece for engagement with the lower end of said coupling pin, the other end of said lock piece being heavier than the said slotted end so that said lock piece, under the action of gravity, will drop into alignment with said pin.

HUGH M. McCLURE.